United States Patent
Shin et al.

(10) Patent No.: US 11,478,725 B2
(45) Date of Patent: Oct. 25, 2022

(54) OLEFINIC MONOMER RECOVERY APPARATUS

(71) Applicant: LG Chem, Ltd., Seoul (KR)

(72) Inventors: Dae Young Shin, Daejeon (KR); Eun Jung Joo, Daejeon (KR); Joon Ho Shin, Daejeon (KR); Chang Hoe Heo, Daejeon (KR); Sung Keun Jang, Daejeon (KR)

(73) Assignee: LG Chem, Ltd.

( * ) Notice: Subject to any disclaimer, the term of this patent is extended or adjusted under 35 U.S.C. 154(b) by 86 days.

(21) Appl. No.: 16/308,183

(22) PCT Filed: Oct. 19, 2017

(86) PCT No.: PCT/KR2017/011613
§ 371 (c)(1),
(2) Date: Dec. 7, 2018

(87) PCT Pub. No.: WO2018/093052
PCT Pub. Date: May 24, 2018

(65) Prior Publication Data
US 2019/0262742 A1    Aug. 29, 2019

(30) Foreign Application Priority Data
Nov. 17, 2016 (KR) .......................... 10-2016-0153517

(51) Int. Cl.
*B01D 5/00* (2006.01)
*B01D 45/02* (2006.01)
(Continued)

(52) U.S. Cl.
CPC .......... *B01D 5/0012* (2013.01); *B01D 5/009* (2013.01); *B01D 5/0096* (2013.01); *B01D 45/02* (2013.01);
(Continued)

(58) Field of Classification Search
CPC ...... B01D 5/00; B01D 5/0003; B01D 5/0057; B01D 5/0075; B01D 53/00; B01D 53/002;
(Continued)

(56) References Cited

U.S. PATENT DOCUMENTS 2,818,935 A    1/1958  Kemmetmuller
3,627,746 A  * 12/1971  Beals ...................... C08F 10/00
                                                                                526/64
(Continued)

FOREIGN PATENT DOCUMENTS

CN      86102878 A      1/1987
CN       1176254 A      3/1998
(Continued)

OTHER PUBLICATIONS

Search Report from International Application No. PCT/KR2017/011613, dated Jun. 25, 2018.
(Continued)

*Primary Examiner* — Robert A Hopkins
*Assistant Examiner* — Qianping He
(74) *Attorney, Agent, or Firm* — Lerner, David, Littenberg, Krumholz & Mentlik, LLP

(57) ABSTRACT

The present invention relates to an olefinic monomer recovery device capable of suppressing fouling and pressure drop in the recovery device in a process of separating and recovering unreacted monomers after production of a polyolefin resin. The olefinic monomer recovery device is used for separating and recovering unreacted olefinic monomers after production of a polyolefin resin, the apparatus comprising a vertical-type heat exchange unit, and a knock-out drum unit.

4 Claims, 1 Drawing Sheet

(51) Int. Cl.
*C08J 11/02* (2006.01)
*C08F 10/02* (2006.01)
*C08F 6/00* (2006.01)

(52) U.S. Cl.
CPC ............... *C08F 6/00* (2013.01); *C08F 10/02* (2013.01); *C08J 11/02* (2013.01); *C08J 2323/06* (2013.01); *C08J 2323/08* (2013.01)

(58) Field of Classification Search
CPC ...... B01D 45/02; B01D 5/0012; B01D 5/009; B01D 5/0096; B01D 19/00; B01D 19/0005; B01D 19/0068; B01D 53/005; B01D 5/0069; C08J 2323/08; C08J 2323/06; C08J 11/02; C08F 10/02; C08F 6/00; C08F 6/001; C08F 6/006; F28G 1/16; F28G 1/163; F28G 15/00; B08B 9/02; B08B 5/00; B08B 2205/00; C07C 7/00; C07C 7/005
USPC ................ 95/241–266; 165/600; 62/600
See application file for complete search history.

(56) References Cited

U.S. PATENT DOCUMENTS

| | | | |
|---|---|---|---|
| 3,884,766 A | 5/1975 | Bir et al. | |
| 3,925,149 A | 12/1975 | Erwin | |
| 4,693,304 A * | 9/1987 | Volland | B01D 1/04 165/88 |
| 4,699,976 A | 10/1987 | Matsubara et al. | |
| 5,037,955 A | 8/1991 | Dighton et al. | |
| 5,453,559 A | 9/1995 | Phillips et al. | |
| 5,898,053 A | 4/1999 | Leaney et al. | |
| 6,015,933 A | 1/2000 | Abrevaya et al. | |
| 6,218,484 B1 | 4/2001 | Brown et al. | |
| 6,472,482 B1 | 10/2002 | Evertz et al. | |
| 6,525,149 B1 | 2/2003 | Baxter, Jr. et al. | |
| 9,458,390 B2 | 10/2016 | Keusenkothen | |
| 2005/0092444 A1* | 5/2005 | Kohlgruber | F28F 13/08 159/2.1 |
| 2010/0004407 A1* | 1/2010 | Goossens | C08F 10/02 526/64 |
| 2010/0004408 A1 | 1/2010 | Baita et al. | |
| 2010/0063224 A1 | 3/2010 | Kimoto | |
| 2016/0290731 A1 | 10/2016 | Kayser et al. | |
| 2018/0030181 A1* | 2/2018 | Emoto | B01D 3/14 |

FOREIGN PATENT DOCUMENTS

| | | |
|---|---|---|
| CN | 100467495 C | 3/2009 |
| CN | 101501079 A | 8/2009 |
| CN | 101671405 A | 3/2010 |
| CN | 101754985 A | 6/2010 |
| CN | 104128063 A | 11/2014 |
| EP | 0675094 A2 | 10/1995 |
| EP | 2176300 B1 | 8/2012 |
| JP | 2002020405 A | 1/2002 |
| JP | 2010065068 A | 3/2010 |
| KR | 19980018658 A | 6/1998 |
| KR | 100338407 B1 | 5/2002 |
| KR | 100600256 B1 | 7/2006 |
| KR | 20090034936 A | 4/2009 |
| KR | 101357569 B1 | 2/2014 |
| KR | 20160094422 A | 8/2016 |

OTHER PUBLICATIONS

Extended European Search Report including Written Opinion for Application No. EP17872684.0 dated Apr. 16, 2019.
Chinese Search Report for Application No. 201780033840.X dated Aug. 25, 2020, 2 pages.

* cited by examiner

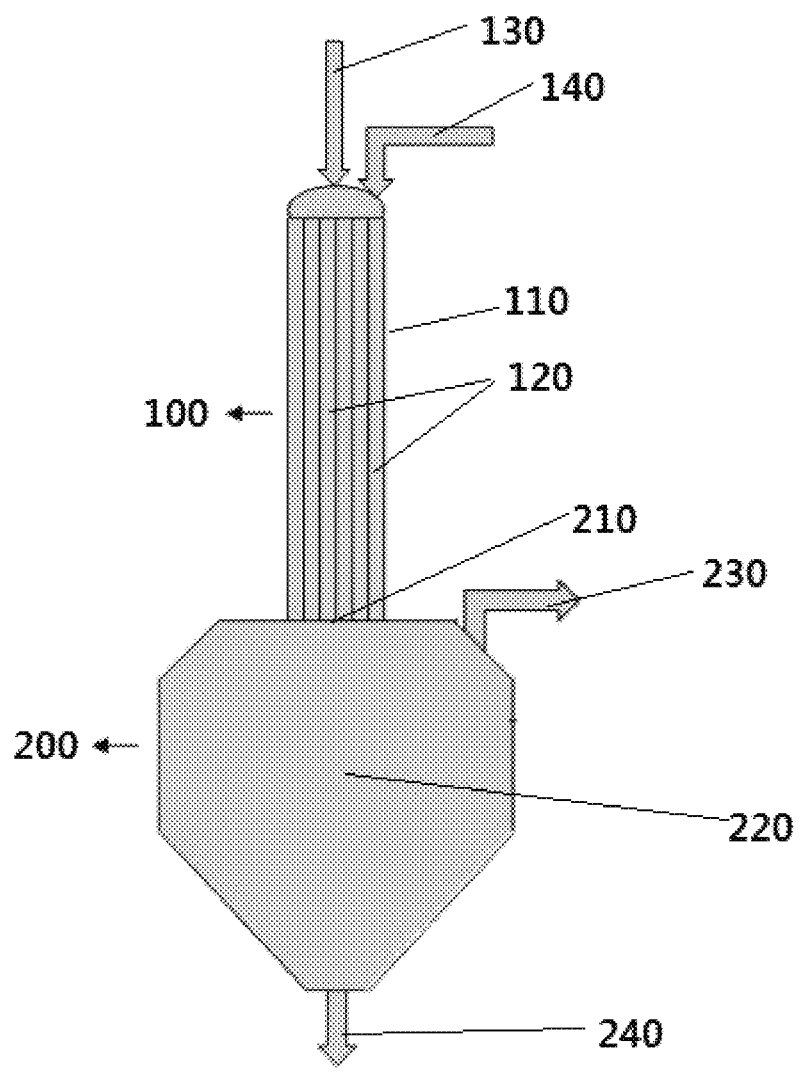

OLEFINIC MONOMER RECOVERY APPARATUS

CROSS-REFERENCE TO RELATED APPLICATIONS

This application is a national phase entry under 35 U.S.C. § 371 of International Application No. PCT/KR2017/011613, filed Oct. 19, 2017, which claims priority to Korean Patent Application No. 10-2016-0153517 filed Nov. 17, 2016, the disclosures of which are incorporated herein by reference.

TECHNICAL FIELD

The present invention relates to an olefinic monomer recovery apparatus capable of suppressing fouling and pressure drop in the recovery apparatus in a process of separating and recoviern unreacted monomers after production of a polyolefin resin.

BACKGROUND

Polyolefin resins comprising homopolymers of ethylene or ethylene-alpha olefin copolymers and the like are generally produced by high-pressure polymerization of olefinic monomers such as ethylene or alpha olefins in an autoclave reactor or a tubular reactor. After the polyolefin resin is produced in such a high-pressure polymerization reactor, the polymerization product containing the polyolefin resin can be generally passed through a high pressure separator (HPS) to recover the polyolefin resin and separate the remaining unreacted olefinic monomer-containing gas.

In such unreacted olefin monomer-containing gas, by-products having a molecular weight lower than that of the polyolefin resin, for example, by-products such as polyolefin wax, polyolefin resins or the like not yet recovered in the high-pressure separator may be contained as impurities. Accordingly, such unreacted olefinic monomer-containing gas is supplied to an apparatus for recovering olefinic monomers, whereby an olefinic monomer gas having higher purity can be recovered. The olefinic monomer thus recovered can be reused in a polymerization process for producing a polyolefin resin.

U.S. Pat. No. 3,627,746 discloses an example of the apparatus for recovering olefinic monomers. Such a conventional apparatus for recovering olefinic monomers includes a high-pressure separator for separating and recovering the above-mentioned polyolefin resin, and it includes a plurality of horizontal-type heat exchangers and a knock-out drum connected thereto. More specifically, the horizontal-type heat exchanger is mainly composed of shell and tube types, and a plurality of horizontal-type heat exchangers and a plurality of knock-out drums are alternately arranged and connected to each other by separate tubes.

In such a conventional olefinic monomer recovery apparatus, the polyolefin resin is recovered from a high-pressure separator, and the remaining separated unreacted olefinic monomer-containing gas may pass through the plurality of horizontal-type heat exchangers and the plurality of knock-out drums alternately arranged and connected. In the heat exchanger, the unreacted olefinic monomer-containing gas is cooled by a cooling medium, a liquid containing a by-product such as the polyolefin wax, and a polyolefin resin or the like not yet recovered from the high-pressure separator can be separated from the cooled unreacted olefinic monomer-containing gas. As a result, the unreacted olefinic monomer can be recovered in a gaseous state with a relatively high purity and can be reused in the polymerization process.

However, in the case of such a conventional olefinic monomer recovery apparatus, a fouling phenomenon frequently occurs in each of tubes connecting the plurality of horizontal-type heat exchangers and the plurality of knock-out drums. This is because in a process where the unreacted olefinic monomer-containing gas passes through each tube, a liquid such as polyolefin wax or resin can be dropped and accumulated on the tube wall or the like. Moreover, in an actual olefinic monomer recovery apparatus, most of the tubes is difficulty to make into a straight tube in consideration of the installation area, etc. of the entire recovery apparatus. Thus, a pressure drop or the like is generated in the tube, so that the fouling phenomenon may occur more severely.

When such fouling phenomenon occurs, the heat transfer efficiency may decrease from the surface of heat transfer tubes of the heat exchanger and thus the cooling effect may be lowered. Further, the wax or the resin component accumulated on the tube wall and the like may be separated at a later time and may be introduced into a polymerization reactor together with the olefinic monomer-containing gas, which may cause deterioration of the quality of the polyolefin resin. Consequently, it is necessary to clean the heat exchanger and tubes after operation for a certain period of time, which results in a decrease in productivity.

Furthermore, in the case of the conventional olefinic monomer recovery apparatus, since it is necessary to install a plurality of tubes, the installation cost and the area of the entire apparatus are required to be large, and thus the economical efficiency of the process can be lowered.

In this regard, an olefinic monomer recovery apparatus and the like capable of suppressing a fouling phenomenon and a pressure drop and having a more compact structure are continuously being demanded.

Technical Problem

The present invention provides an olefinic monomer recovery apparatus capable of suppressing fouling and pressure drop in the recovery apparatus in a process of separating and recovering unreacted monomers after production of a polyolefin resin.

Technical Solution

The present invention provides an olefinic monomer recovery apparatus used for separating and recovering unreacted olefinic monomers after production of a polyolefin resin, the apparatus comprising a vertical-type heat exchange unit, and a knock-out drum unit, wherein the vertical-type heat exchange unit includes: a heat exchange unit body in which a cooling medium for heat exchange is accommodated; and a plurality of heat transfer tubes which extend in a vertical direction and are installed in the heat exchange unit body so as to be submerged in the cooling medium and through which a gas containing an olefinic monomer and a polyolefin wax passes, and wherein the knock-out drum unit includes: a gas inlet directly connected to the heat transfer tubes of the vertical-type heat exchange unit;

a knock-out separating means for separating an olefinic monomer-containing gas and a polyolefin wax-containing liquid from the gas;

a first discharge tube, installed at an upper portion of the knock-out drum unit, for discharging the olefinic monomer-containing gas; and a second discharge tube, installed at a lower portion of the knock-out drum unit, for discharging the polyolefin wax-containing liquid.

Olefinic monomers can be recovered by the following method using the above-described olefinic monomer recovery apparatus. In other words, this recovery method may include: passing a polymerization product including a polyolefin resin, a polyolefin wax having a lower molecular weight than that of the polyolefin resin, and an unreacted olefin monomer through a high-pressure separator to recover the polyolefin resin and separate a gas containing the olefinic monomer and the polyolefin wax;

supplying the gas containing the olefinic monomer and the polyolefin wax to the plurality of heat transfer tubes of the vertical-type heat exchanger and cooling it by heat exchange with the cooling medium;

supplying the cooled gas to the knock-out separating means through a gas inlet of the knock-out drum unit to separate the olefinic monomer-containing gas and the polyolefin wax-containing liquid; and discharging the olefinic monomer-containing gas and the polyolefin wax-containing liquid to the first and second discharge tubes, respectively.

Advantageous Effects

According to the present invention, an olefinic monomer recovery apparatus and the like capable of suppressing fouling and pressure drop in the recovery apparatus, and having a more compact structure without installation of tubes, in a process of separating and recovering unreacted monomers after production of a polyolefin resin, can be provided.

BRIEF DESCRIPTION OF DRAWINGS

FIG. 1 is a schematic view schematically showing the structure of an olefinic monomer recovery apparatus according to one embodiment of the present invention.

DETAILED DESCRIPTION OF THE EMBODIMENTS

Hereinafter, an olefinic monomer recovery apparatus according to an embodiment of the present invention and a recovery method using the apparatus will be described in detail. However, it will be apparent to those skilled in the art that this is presented as an example of the invention and the scope of the present invention is not limited thereby, and that various modifications can be made to the embodiments within the scope of the invention.

Throughout this specification, the term "upper portion" means a portion corresponding to a height of 50% or more from the total height of a vessel such as a heat exchange unit or a knock-out drum unit, an apparatus or each component included in the apparatus, and the term "lower portion" may mean a portion corresponding to a height of less than 50% from the total height of the vessel, the apparatus or each component contained in the apparatus. In addition, the term "center portion" can be understood in a relative meaning indicating a portion between the upper portion and the lower portion.

Meanwhile, according to one embodiment of the present invention, there is provided an olefinic monomer recovery apparatus used for separating and recovering unreacted olefinic monomers after production of a polyolefin resin, the apparatus comprising a vertical-type heat exchange unit, and a knock-out drum unit, wherein the vertical-type heat exchange unit includes: a heat exchange unit body in which a cooling medium for heat exchange is accommodated, and a plurality of heat transfer tubes which extend in a vertical direction and are installed in the heat exchange unit body so as to be submerged in the cooling medium and through which a gas containing an olefinic monomer and a polyolefin wax passes, and wherein the knock-out drum unit includes: a gas inlet directly connected to the heat transfer tubes of the vertical-type heat exchange unit, a knock-out separating means for separating an olefinic monomer-containing gas and a polyolefin wax-containing liquid from the gas, a first discharge tube, installed at an upper portion of the knock-out drum unit, for discharging the olefinic monomer-containing gas; and a second discharge tube, installed at a lower portion of the knock-out drum unit, for discharging the polyolefin wax-containing liquid.

The recovery apparatus of the one embodiment comprises a vertical-type heat exchange unit including a plurality of heat transfer tubes vertically connected instead of a horizontal-type heat exchanger commonly applied to the existing apparatus, wherein said vertical-type heat exchange unit is directly connected to a lower portion of the knock-out drum unit. In this case, the vertical-type heat exchange unit being "directly" connected to a lower portion of the knock-out drum unit may mean that the heat transfer tube is directly connected to a gas inlet of the knock-out drum unit "without a separate connection tube", and the lower portion of the vertical-type heat exchange unit is directly abutted on an upper portion of the knock-out drum unit.

In the recovery apparatus of this embodiment, as a separate connection tube is not installed, there is no possibility that fouling phenomenon or pressure drop will occur in the tube. Further, heat exchange and cooling take place while the olefinic monomer-containing gas passes through the plurality of heat transfer tubes connected in the vertical direction, and the plurality of heat transfer tubes can have a straight tube shape. Therefore, even in a process where the olefinic monomer-containing gas passes through the inside of these heat transfer tubes, a liquid such as a polyolefin wax or a resin contained therein is dropped, thus minimizing the risk of occurrence of a fouling phenomenon.

Moreover, as the recovery apparatus does not include a separate connection tube or the like, it can have a very compact structure as compared with the existing olefinic monomer recovery apparatus, and the installation cost can also be reduced.

Therefore, the olefinic monomer recovery apparatus according to one embodiment can solve the problems (fouling phenomenon, pressure drop, increase in installation area and cost, etc.) of the recovery apparatus commonly applied in the art, and can be very preferably used in the process of recovering and reusing unreacted olefinic monomers after production of a polyolefin resin.

Hereinafter, the olefinic monomer recovery apparatus according to one embodiment will be described in more detail with reference to the accompanying drawing. FIG. 1 is a schematic view schematically showing the structure of an olefinic monomer recovery apparatus according to one embodiment of the present invention.

As shown in FIG. 1, the recovery apparatus of one embodiment largely includes a vertical-type heat exchange unit 100, and a knock-out drum unit 200 which is directly connected to the vertical-type heat exchange unit 100 without a separate connection tube.

Among them, the vertical-type heat exchange unit 100 includes a heat exchange unit body 110 in which a cooling medium for heat exchange is accommodated; and a plurality of heat transfer tubes 120 which extend in a vertical direction and are installed in the heat exchange unit body 110 so as to be submerged in the cooling medium.

In addition, the vertical-type heat exchange unit 100 may further include a gas inlet 130 containing an olefinic monomer gas and a polyolefin wax which is installed at the upper portion of the vertical-type heat exchange unit 100 so as to be connected to the plurality of heat transfer tubes 120.

After the polyolefin resin is produced by high-pressure polymerization of ethylene, or ethylene and alpha-olefin, such polymerized product passes through a high pressure separator (HPS) or the like to recover the polyolefin resin. Then, the remaining unreacted olefinic monomer-containing gas may include by-products such as the olefinic monomer and the polyolefin wax, and a polyolefin resin not yet recovered from the high-pressure separator as impurities.

The gas containing an olefinic monomer gas and a polyolefin wax can pass through the plurality of heat transfer tubes 120 in the vertical-type heat exchange unit 100 through the gas inlet 130. In such passage process, the gas containing the olefinic monomer and the polyolefin wax can be cooled through heat exchange with the cooling medium around the heat transfer tube 120.

In such heat exchange process, the plurality of heat transfer tubes 120 are connected in the vertical direction, and heat exchange can be carried out while the gas including an olefinic monomer and a polyolefin wax falls vertically. In addition, the plurality of heat transfer tubes 120 can have a straight tube shape arranged in parallel to each other. Therefore, even in a process where the olefinic monomer-containing gas passes through the inside of these heat transfer tubes, a liquid such as a polyolefin wax or a resin contained therein is dropped, thus minimizing the risk of occurrence of a fouling phenomenon.

In the vertical-type heat exchange unit 100 described above, the kind of the cooling medium filling the inside of the body 110, and the material or scale of the body 110 and the heat transfer tubes 120 may follow the conventional configuration of the heat exchanger previously used for recovering the olefinic monomer, and thus an additional description thereof will be omitted.

Meanwhile, the vertical-type heat exchange unit 100 may further include an ethylene gas inlet 140 which is installed in the upper portion of the vertical-type heat exchange unit 100 so as to be connected to the plurality of heat transfer tubes 120, separately from the gas inlet 130 containing the olefinic monomer and the polyolefin wax.

If necessary, ethylene gas can be further supplied to the heat transfer tube 120, separately from the gas containing an olefinic monomer and a polyolefin wax, via the ethylene gas inlet 140. In a process where the ethylene gas passes through the heat transfer tube 120 and the like, several types of defouling can occur, and it can transfer wax, resin and the like adhered to the wall surface or the like to thereby play a role in defouling. Ethylene gas containing wax and resin defouled in this way can be discharged through a first discharge tube 230 of the knockout drum unit 200 described later. As a result, the recovery apparatus of one embodiment can further reduce the problems caused by fouling of the wax and resin.

Meanwhile, the recovery apparatus of one embodiment further includes a knock-out drum unit 200 directly connected to the vertical-type heat exchange unit 100 described above. For this direct connection, the gas inlet 210 of the knock-out drum unit 200 is directly connected to the heat transfer tube 120 of the vertical-type heat exchange unit 100 without a separate connection tube, and the lower portion of the vertical-type heat exchange unit 100 is directly abutted on the upper portion of the knock-out drum portion 200. Consequently, in a process where the cooling gas containing olefinic monomer and polyolefin wax, which have passed through the vertical-type heat exchange unit 100, is supplied to the knock-out drum unit 200, there is practically no risk of occurrence of fouling phenomenon and pressure drop.

Further, the knock-out drum unit 200 includes a knock-out separating means 220 for separating an olefinic monomer-containing gas and a polyolefin wax-containing liquid from the gas which have been supplied from the gas inlet 210. This knock-out separating means 220 may be a means for separating a gas and a liquid droplet using a density difference or a means for separating a centrifugal gas and a liquid droplet according to a configuration of a conventional knock-out drum. However, when centrifugal separation means is applied, a centrifugal force is applied and a vortex of gas is generated. In the recovery apparatus of one embodiment, the vertical-type heat exchange unit 100 is connected directly above the knock-out drum 200, it may be difficult to generate the vortex of the gas and to separate the gas/liquid by centrifugation. Thus, in the recovery apparatus of one embodiment, the knock-out separating means 220 is preferably a means for separating a gas and a liquid droplet using a density difference. After passing through this separation means, the olefinic monomer-containing gas and the liquid droplet containing the polyolefin wax and optionally a polyolefin resin can be separated by their respective density differences.

The olefinic monomer-containing gas thus separated can be discharged through a first discharge tube 230 installed at the upper portion of the knock-out drum unit 200, and the liquid containing the polyolefin wax and optionally the polyolefin resin falls in the form of a liquid droplet and can be discharged through a second discharge pipe 240 installed at the lower portion of the knock-out drum unit 200.

On the other hand, although not clearly shown in FIG. 1, in order to further improve the separation efficiency of the means for separating the gas and liquid droplet using the density difference, an inlet preventing wall of wax and resin can be additionally provided on the inlet side of the first discharge tube 230.

Further, as already described above, in order to suppress additional fouling in the vertical-type heat exchange unit 100, an ethylene gas inlet 140 may be further included in the upper portion of the vertical-type heat exchanger 100, and through which the injected ethylene gas can defoul by transferring wax, resin or the like adhered to the wall surface of the heat transfer tube 120.

In this case, the ethylene gas containing the defouled wax or resin may be separated into the defouled wax or resin and the ethylene gas in the knock-out separating means 220 of the knock-out drum unit 200. The defouled wax or resin thus separated may be discharged to a second discharge pipe 240, and the ethylene gas may be discharged together with the olefinic monomer-containing gas through the first discharge tube 230. Thereby, the recovery apparatus of one embodiment can minimize problems caused by fouling of the wax or resin.

On the other hand, the olefinic monomer-containing gas and optionally the ethylene gas discharged to the above-mentioned first discharge tube 230 can be condensed as needed, and recovered as an olefinic monomer, and can be reused for the polymerization of the additional polyolefin resin.

The configuration of the knock-out drum unit 200 described above may correspond to a configuration of a conventional knock-out drum, except for the points described above, and so an additional description thereof will be omitted.

The method for recovering olefinic monomers using the recovery apparatus of one embodiment described above can be carried out as follows.

First, a polyolefin resin can be produced through a high pressure polymerization of an olefinic monomer such as ethylene or alpha olefin in an autoclave reactor or a tubular reactor. The polymerization product after such polymerization may include a polyolefin resin, a polyolefin wax having a lower molecular weight than that of the polyolefin resin, and an unreacted olefinic monomer. Such polymerization product is passed through a high-pressure separator to recover the polyolefin resin, and separate the gas including the olefinic monomer and the polyolefin wax. At this time, the gas may further contain a small amount of polyolefin resin that has not yet been recovered.

Subsequently, the gas including the olefinic monomer and the polyolefin wax may be supplied to the plurality of heat transfer tubes 120 of the vertical-type heat exchange unit 100 and cooled by heat exchange with the cooling medium. In this process, a separate ethylene gas for additional defouling may be further supplied to the heat transfer tube 120. The ethylene gas can be subjected to defouling by transferring a small amount of wax and resin attached to the wall surface of the heat transfer tube 120.

The gas thus cooled, that is, the gas containing the olefinic monomer and the polyolefin wax may be supplied to the knock-out separating means 220 through the gas inlet 210 of the knock-out drum unit 200, whereby it can be separated into the olefinic monomer-containing gas and the polyolefin wax-containing liquid. In addition, the defouled ethylene gas be separated into defouled wax or resin and ethylene gas by the knock-out separating means 220 of the knock-out drum unit 200. The defouled wax or resin thus separated may be discharged to the second discharge tube 240, and the ethylene gas may be discharged together with the olefinic monomer-containing gas through the first discharge tube 230.

Thereafter, the olefinic monomer-containing gas (optionally including ethylene gas) and the polyolefin wax-containing liquid (optionally including defouled wax or resin-containing liquid) may be discharged to the first and second discharge tubes 230 and 240, respectively. The olefinic monomer-containing gas discharged to the first discharge tube 230 can be recovered and reused for polymerization of the polyolefin resin.

With this recovery method, the olefinic monomer can be recovered with high purity without concern about fouling, and the recovery apparatus of one embodiment can have a compact construction and a low installation cost without a separate connection tube while minimizing the concern of such fouling. Therefore, the recovery apparatus and the recovery method according to the embodiment of the present invention can be very preferably applied for recovering olefinic monomers such as ethylene and alpha olefins after production of the polyolefin resin.

EXPLANATION OF SIGN

100: vertical-type heat exchange unit;
110: heat exchange unit body;
120: heat transfer tube;
130: gas inlet including olefinic monomer and polyolefin wax;
140: ethylene gas inlet;
200: knock-out drum unit;
210: gas inlet;
220: knock-out separating means;
230: first discharge tube;
240: second discharge tube.

The invention claimed is:

1. A method of separating and recovering unreacted olefinic monomers after production of a polyolefin resin, comprising:
   (a) supplying a gas including an olefinic monomer and polyolefin wax to a plurality of heat transfer tubes of a vertical type heat exchange unit, wherein the step of supplying an olefinic monomer and polyolefin wax further comprises supplying a separate ethylene gas directly to the plurality of heat transfer tubes so as to defoul a polyolefin wax or resin on a wall surface of the heat transfer tubes;
   (b) cooling the gas including the olefinic monomer and polyolefin wax using a cooling medium in the heat exchange unit to produce a cooled gas;
   (c) supplying the cooled gas and the ethylene gas to a knock out drum unit;
   (d) providing a knock out separating means, the knock out separating means located within the knock out drum unit, the knock out separating means for separating the cooled gas and ethylene gas into an olefinic monomer containing gas and a polyolefin wax containing liquid;
   (e) discharging the olefinic monomer containing gas and ethylene gas within the knock out drum unit through a first discharge tube; and
   (f) discharging the polyolefin wax containing liquid through a second discharge tube.

2. The method of claim 1, wherein the gas containing the olefinic monomer and the polyolefin wax is supplied using a first inlet installed on an upper portion of the vertical-type heat exchange unit so as to be connected to the plurality of heat transfer tubes and wherein the ethylene gas is supplied using a second inlet.

3. The method of claim 1, wherein the knock-out separating means comprises a means for separating gas and liquid droplet using a density difference.

4. The method of claim 1, further comprising preventing inflow of wax and resin provided on the inlet side of the first discharge tube using a wall.

* * * * *